(12) United States Patent
Micaelian et al.

(10) Patent No.: US 7,979,375 B2
(45) Date of Patent: *Jul. 12, 2011

(54) ENGINES, METHODS, AND SYSTEMS FOR NORMALIZING HETEROGENEOUS PARAMETERS FOR SCORING PROPOSALS

(75) Inventors: Fadi Victor Micaelian, Menlo Park, CA (US); Emil Mario Scoffone, Menlo Park, CA (US)

(73) Assignee: Auguri Corporation, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/578,435

(22) Filed: Oct. 13, 2009

(65) Prior Publication Data

US 2010/0030666 A1 Feb. 4, 2010

Related U.S. Application Data

(63) Continuation of application No. 11/643,019, filed on Dec. 19, 2006, now Pat. No. 7,624,083.

(51) Int. Cl.
*G06F 17/00* (2006.01)
*G06Q 40/00* (2006.01)
*G06N 5/02* (2006.01)

(52) U.S. Cl. .......... 706/46; 705/35; 705/37; 705/22; 705/14.71

(58) Field of Classification Search .......... 706/46, 706/48; 705/1, 35, 37
See application file for complete search history.

(56) References Cited

U.S. PATENT DOCUMENTS 7,110,976 B2 * 9/2006 Heimermann et al. ......... 705/37
* cited by examiner

*Primary Examiner* — Donald Sparks
*Assistant Examiner* — Ola Olude-Afolabi
(74) *Attorney, Agent, or Firm* — Perkins Coie LLP

(57) ABSTRACT

The invention includes a tradeoff module having a range of values, a criteria behavior module that analyzes attributes including values of the criteria for a set of alternatives, generating a set of scores reflecting the desirability of the attributes using logic diagrams, and a scoring and ranking module that utilizes assigned values from the tradeoff module and the set of scores from the criteria behavior module to generate a ranked list of alternatives. The invention is used to facilitate a reverse auction, where suppliers submit bids to a purchaser desiring specific goods or services. The invention discloses a system for generating a ranked list of alternatives, including means for generating a homogeneous matrix of scores based on a heterogeneous matrix of attributes and alternatives, means for receiving a tradeoff value, and means for generating a ranked list of alternatives based on the homogeneous matrix of scores and the tradeoff value.

24 Claims, 8 Drawing Sheets

ENGINES, METHODS, AND SYSTEMS FOR NORMALIZING HETEROGENEOUS PARAMETERS FOR SCORING PROPOSALS

CLAIM OF PRIORITY

This application is a continuation of U.S. patent application Ser. No. 11/643,019, filed Dec. 19, 2006, which is hereby incorporated herein by reference.

BACKGROUND OF INVENTION

1. Field of Invention

The present invention relates to computer-assisted methods for choosing or prioritizing among heterogeneous alternatives and more specifically to engines, methods, and systems for normalizing heterogeneous parameters for scoring proposals.

2. Description of Related Art

The process of ordering a number of alternatives and selecting one of the alternatives presents a number of problems. For example, the values of the criteria used to select from among the alternatives are often heterogeneous—they have different semantics, different units of measure and range, and so on. For example, the price of a laptop computer is measured in dollars, whereas laptop computer screen size is measured in inches. Also, the values of the criteria may have different degrees of desirability for different decision makers. One decision maker may prefer a larger screen because of its increased visibility, while another decision maker may prefer a smaller screen because of its greater portability.

The ordering and selecting process typically involves some degree of tradeoff among the various selection criteria. Tradeoffs are necessary because it is unusual for one alternative to be superior to all other alternatives in all respects. For example, as the disk drive capacity of laptop computers increases (a desirable trend), the price also increases (an undesirable trend).

Each alternative is characterized by a set of objective values corresponding to the selection criteria. The values of the selection criteria are objective in that the values are independent of the preferences and biases of decision makers. However, a meaningful comparison among the selection criteria cannot be accomplished easily and accurately using only the objective values of the criteria. A meaningful comparison must be based on a set of values that reflects the subjective nature of the preferences of individual decision makers, and must be based on a common unit.

What is needed is technology that converts the matrix of heterogeneous objective values into a matrix of homogeneous subjective scores that reflects the desirability of the corresponding objective values. The subjective scores must be normalized to the same unit so that they can be compared directly, both across criteria and across alternatives. Such technology is not to be found in the prior art.

Certain embodiments of the present invention address some of these problems.

SUMMARY OF THE INVENTION

The present invention contemplates a variety of improved engines, methods, and systems for making computer-assisted choices among heterogeneous alternatives. For example, engines, methods, and systems for normalizing heterogeneous parameters for scoring proposals are contemplated.

In one embodiment, the present invention teaches a comparison engine that generates a ranked list of alternatives (such as proposals or items of consumer merchandise), in which each alternative is assigned a score that reflects the degree to which the alternative matches a target, subject to tradeoffs among criteria. The comparison engine includes a tradeoff module that has at least two tradeoff criteria having a range of possible values that may be provided by a user or a machine. The comparison engine may further include a criteria behavior module that is capable of analyzing predetermined attributes, such as values of the criteria for a set of alternatives, and generating a set of scores reflecting the desirability of the attributes using logic diagrams such as affinity curves, workflows, decision trees, statistical models, and programming modules. The comparison engine may further include a scoring and ranking module that takes the assigned values from the tradeoff module and the set of scores from the criteria behavior module and generates a ranked list of alternatives. The comparison engine may also include a training module that can be trained by a user to create logic diagrams, and an authentication module used to authenticate a user's identity.

In one embodiment, the criteria behavior module transforms a heterogeneous matrix of alternatives and attributes into a homogeneous matrix containing scores that represent the alternatives and attributes. The ranked list of alternatives produced by the comparison engine is generated by taking a weighted sum of the scores from the criteria behavior module, with the weights being the assigned values from the tradeoff module. The comparison engine assesses and scores the proposals automatically, at the click of a button, without the need for a human to read, assess, and score the proposals.

The comparison engine includes at least two input methods that allow a user or machine to specify the importance of at least two of the tradeoff criteria on a scale ranging from not very important to very important. Slider bars, text fields, or rows of radio buttons may implement the input methods, for example. The comparison engine normalizes the input of the input methods.

The comparison engine can be used to facilitate a multi-criteria reverse auction, in which suppliers submit bids to a purchaser who desires specific goods or services. The purchaser defines an ideal profile (as described in the body of the invention) for the desired goods or services, the tradeoffs correspond to the relevance of the various criteria, and the ranked list of alternatives corresponds to bids. The authentication module of the comparison engine is used to authenticate the purchaser and the suppliers in the reverse auction.

The present invention also discloses a method for generating a ranked list of alternatives, including the steps of generating a homogeneous matrix of scores based on a heterogeneous matrix of attributes and alternatives, receiving at least two tradeoff values, and generating a ranked list of alternatives based on the homogeneous matrix of scores and the tradeoff values. Logic diagrams as described above are used to generate the homogeneous matrix of scores. The ranked list of alternatives is generated by calculating the weighted sum of the scores in the homogeneous matrix of scores and the tradeoff value. The method can be used to facilitate a reverse auction including the steps of receiving bid information from at least two bidders (suppliers), generating a heterogeneous matrix of alternatives and attributes based on the bid information, and scoring the bids according to the homogeneous matrix of scores, where the bid information comprises the ranked list of alternatives.

The present invention also discloses a system for generating a ranked list of alternatives, including means for generating a homogeneous matrix of scores based on a heterogeneous matrix of attributes and alternatives, means for receiving a tradeoff value, and means for generating a ranked list of alternatives based on the homogeneous matrix of scores and the tradeoff value. The system includes means for generating a logic diagram to be used to generate the homogeneous matrix of scores.

BRIEF DESCRIPTION OF DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION OF THE INVENTION

Figure 1:
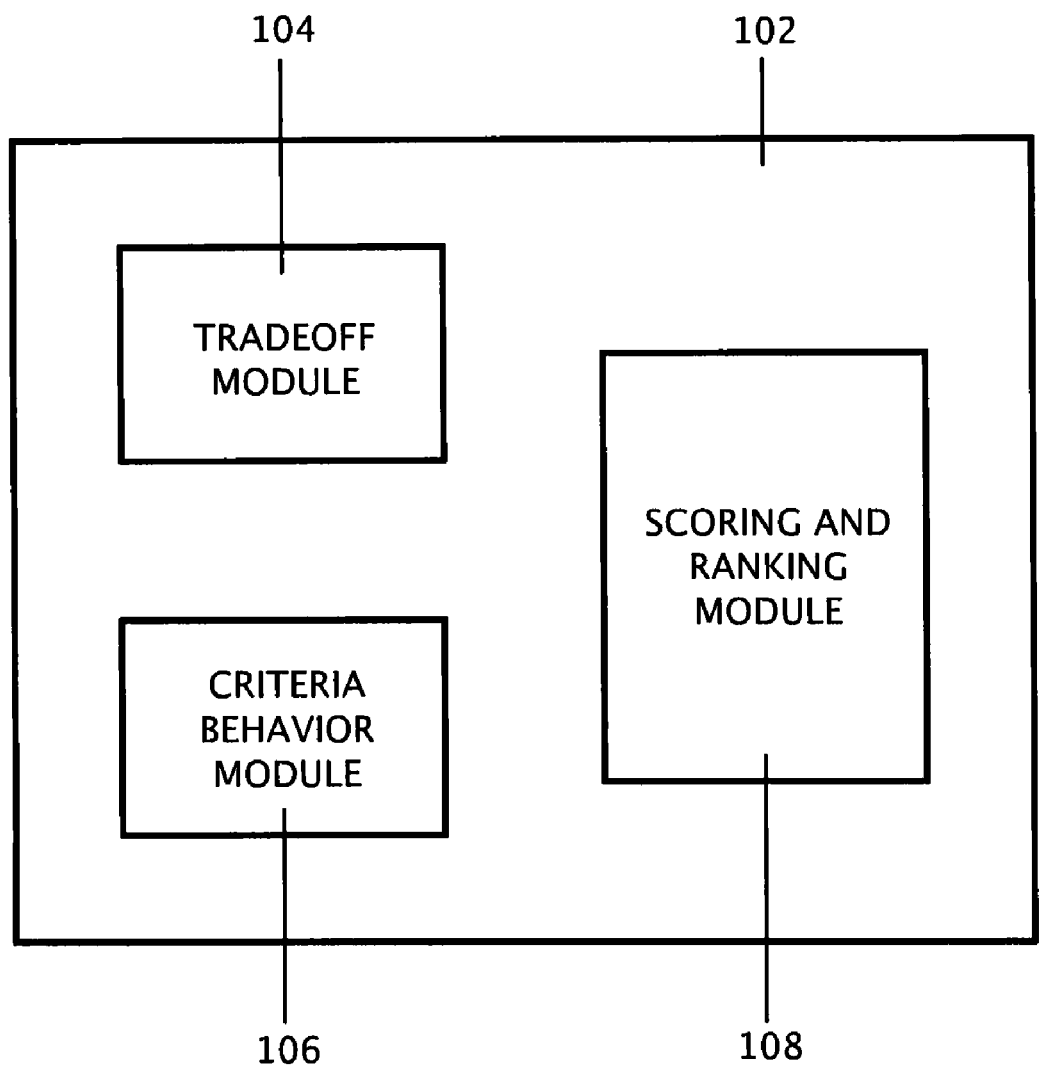
FIG. 1 is a block diagram showing three modules of a comparison engine of the present invention.

The present invention contemplates a variety of improved engines, methods, and systems for making computer-assisted choices among heterogeneous alternatives. More specifically, engines, methods, and systems for normalizing heterogeneous parameters for scoring proposals are contemplated.

In one embodiment, the present invention includes a comparison engine that generates a ranked list of alternatives (such as proposals or consumer goods), in which each alternative is assigned a score that reflects its degree of closeness to the ideal, subject to the constraints defined by the tradeoffs. For example, a consumer may be attempting to select a computer display from a plurality of alternative computer displays. The consumer can make her selection from among the alternatives based on criteria such as screen size, resolution, cost, weight, ranking by an independent party, etc. These criteria may be difficult for the consumer to compare directly, given the heterogeneous nature of the criteria. The comparison engine converts the heterogeneous consumer input into a homogeneous matrix of scores that are then ranked by the comparison engine.

The comparison engine converts the heterogeneous matrix of alternatives into a homogeneous matrix of scores. The comparison engine then uses the homogeneous matrix of scores to generate a vector of final scores. That is, the comparison engine uses the homogeneous matrix of scores to map the vector of tradeoffs into a vector of cumulative scores for the alternatives. The alternatives are then ranked by their cumulative scores.

Before discussing further details of the present invention, it is helpful to review some background information. The importance of the invention, the challenge to which the invention is addressed, and how the challenge is met, are discussed below.

The process of ordering a number of alternatives and selecting one of the alternatives typically involves some degree of tradeoff among various selection criteria. Tradeoffs are necessary because it is unusual for one alternative to be superior to all other alternatives in all respects. For example, as the disk drive capacity of laptop computers increases (a desirable trend), the price also increases (an undesirable trend). The ranking technology disclosed herein accounts for the various components of the selection process, which are enumerated below.

1. The use of more than one selection criterion improves the granularity of the selection process.
2. Each selection criterion "pulls" toward some ideal value; for example, a low price, a high disk storage capacity, a fast CPU speed.
3. The tradeoff weights (defined below with respect to the tradeoff module) describe the manner in which the decision maker balances the competing and conflicting pulls from the various selection criteria.

One embodiment of the present invention is directed to the following challenge. Each one of a set of alternatives is characterized by a set of objective values corresponding to the set of selection criteria. For example, selection criteria for laptop computers include price, disk storage capacity, and CPU speed. The values of the selection criteria are objective in that the values are independent of the preferences and biases of decision makers. The values of the selection criteria are heterogeneous—they have different semantics, different units of measure and range, and so on. For example, price is measured in dollars and may range between $800.00 and $3,200.00, whereas disk storage capacity is measured in megabytes and may range between 20 Mb and 120 Mb.

Further, the values of the selection criteria may have different degrees of desirability for different decision makers: whereas one may assume that all decision makers prefer lower prices to higher prices, some decision makers prefer higher screen sizes because they have greater display capability while other decision makers prefer smaller screen sizes because they have greater portability. Therefore, a meaningful comparison among the selection criteria cannot be accomplished easily and accurately using only the objective values of the criteria. Rather, a meaningful comparison must be based on a set of values that reflect the subjective nature of the preferences of individual decision makers, and must be based on a common unit.

One criteria behavior module of the present invention meets this challenge. The criteria behavior module uses a set of user-definable, criterion-specific parameterized algorithm templates to convert the matrix of heterogeneous objective values into a matrix of homogeneous subjective scores that reflects the desirability of the corresponding objective values. These scores are normalized to the same unit and can therefore be compared directly, both across criteria and across alternatives. For each value of each criterion for each alternative, the criteria behavior module applies the criterion-specific algorithms to the value in order to obtain a normalized score.

FIG. 1 is a block diagram of a comparison engine 102, according to one embodiment of the present invention. The comparison engine 102 includes a tradeoff module 104, a criteria behavior module 106, and a scoring and ranking module 108. These modules might be instantiated by one or more computer processes running on a single computer or across a distributed platform. Specific embodiments will be described further below.

The tradeoff module 104 permits a user or machine to set the values of criteria by which various alternatives are compared. For example, a criterion of price for alternatives such as personal computers might have a value of 75/100 on a scale ranging from not very important 0/100 to very important 100/100. The criteria behavior module assigns a score reflecting the desirability of each value of each criterion for each alternative. For example, a value of $1,000 for the criterion of price for the alternative computer #1 might have a desirability of 0.6, whereas a value of $1,200 for the criterion of price for the alternative computer #2 might have a desirability of 0.75. The scale of desirability begins at 0 for a perfect match between the value and the desired good and increases as the match worsens. Thus, a price of $1,000 (with a desirability of 0.6) is more desirable (better) than a price of $1,200 (with a desirability of 0.75). The scoring and ranking module ranks the alternatives based on the values assigned by the tradeoff module and the scores assigned by the criteria behavior module.

The tradeoff module 104 has at least two tradeoff criteria that have a range of possible values that may be provided by a user or a machine. These values represent the weight or importance of the tradeoff criteria. If the alternatives are personal computers, then the tradeoff criteria might include past performance, price, delivery time, CPU speed, screen size, weight, height, memory, disk storage size, battery lifetime, and DVD type. The values are assigned weights ranging from not very important to very important. These weighted values are normalized by the comparison engine to produce values such as 80/100.

In certain embodiments, a graphical user interface is provided to enable the user to set values for criteria, alternatives, and the like. For example, the user may set the values of the criteria by manipulating a slider bar. Alternatively, a computer may be programmed to set the values of the criteria in a manner based on past usage or default values.

Examples of criteria and ranges of values are discussed further with reference to FIGS. 3 and 4 below.

The criteria behavior module 106 analyzes predetermined attributes for a set of alternatives and generates a set of scores reflecting the desirability of the attributes. In the embodiment of FIG. 1, the analysis is accomplished through matrix manipulation. The analyzed attributes include the values of the tradeoff criteria. For example, if the alternatives are personal computers, computer #1 is a personal computer, price is a criterion, and $1,000 is the value of price for computer #1, then a price of $1,000 is an attribute of computer #1.

The criteria behavior module 106 transforms a heterogeneous matrix of alternatives and attributes into a homogeneous matrix containing scores that represent the alternatives and attributes. The criteria behavior module 106 analyzes the value for each criterion with respect to each alternative, and generates a set of scores that reflects the desirability of each value for each criterion with respect to each alternative. The criteria behavior module 106 uses logic diagrams such as affinity curves, workflows, decision trees, statistical models, and programming modules. Examples of values of criteria with respect to various alternatives are discussed further with reference to FIGS. 3 and 4 below.

The scoring and ranking module 108 takes the values from the tradeoff module 104 and the set of scores from the criteria behavior module 106 and generates a ranked list of alternatives. The ranked list of alternatives is generated by taking a weighted sum of the values from the tradeoff module 104 and the set of scores from the criteria behavior module 106. The cumulative scores obtained by the weighted sum are then ordered to yield the ranked list.

For example, suppose that the alternatives are personal computer #1 and personal computer #2, the criteria are price and screen size, personal computer #1 has a price of $1,000, personal computer #2 has a price of $1,200, personal computer #1 has a screen size of 15", personal computer #2 has a screen size of 20", price has a tradeoff value of 0.5, screen size has a tradeoff value of 0.6, a price of $1,000 for personal computer #1 has a desirability of 0.7, a price of $1,200 for personal computer #2 has a desirability of 0.8, a screen size of 15" for personal computer #1 has a desirability of 0.6, and a screen size of 20" for personal computer #2 has a desirability of 0.5. The criteria matrix then contains two rows, one for each alternative, the values of which are ($1,000, 15") for personal computer #1 and ($1,200, 20") for personal computer #2. The criteria behavior module converts this matrix of heterogeneous values into a matrix of corresponding homogeneous scores, the rows of which are (0.7, 0.6) and (0.8, 0.5) for personal computers #1 and #2, respectively. The weighted sums are (0.7*0.5)+(0.6*0.6)=0.35+0.36=0.71 for personal computer #1, and (0.8*0.5)+(0.5*0.6)=0.40+0.30=0.70 for personal computer #2. Thus, personal computer #2 is ranked first, since personal computer #2 has the lowest cumulative score; personal computer #1 is ranked second.

This algorithm has meaningfully compared such diverse criteria for laptop computers as price and screen size.

Figure 2:
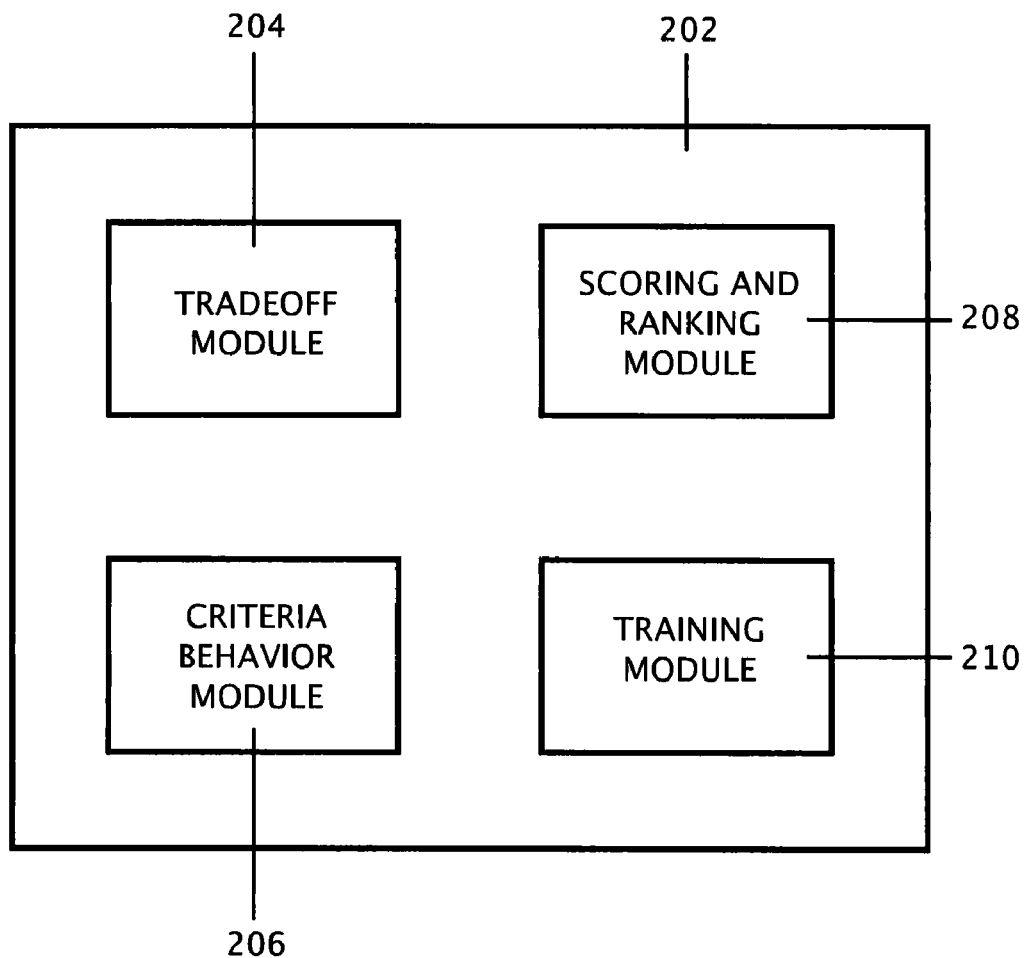
FIG. 2 is a block diagram showing the three modules of a comparison engine of the present invention together with an additional training module.

FIG. 2 is a block diagram of a comparison engine 202 according to another embodiment of the present invention. The comparison engine 202 includes a tradeoff module 204, a criteria behavior module 206, a scoring and ranking module 208, and a training module 210. The training module 210 can be trained by a user to create the logic diagrams used by the criteria behavior module 206.

The tradeoff module 204 permits a user or machine to set the values of criteria by which various alternatives are compared. For example, a criterion of price for alternatives such as personal computers might have a value of 75/100 on a scale ranging from not very important 0/100 to very important 100/100. The criteria behavior module assigns a score reflecting the desirability of each value of each criterion for each alternative. For example, a value of 1,000 for the criterion of price for the alternative computer #1 might have a desirability of 0.6, whereas a value of $1,200 for the criterion of price for the alternative computer #2 might have a desirability of 0.75. The scale of desirability begins at 0 for a perfect match between the value and the desired good and increases as the match worsens. Thus, a price of $1,000 (with a desirability of 0.6) is more desirable (better) than a price of $1,200 (with a desirability of 0.75). The scoring and ranking module ranks the alternatives based on the values assigned by the tradeoff module and the scores assigned by the criteria behavior module.

The tradeoff module 204 has at least two tradeoff criteria that have a range of possible values that may be provided by a user or a machine. These values represent the weight or importance of the tradeoff criteria. If the alternatives are personal computers, then the tradeoff criteria might include past performance, price, delivery time, CPU speed, screen size, weight, height, memory, disk storage size, battery lifetime, and DVD type. The values are assigned weights ranging from not very important to very important. These weighted values are normalized by the comparison engine to produce values such as 80/100.

In certain embodiments, a graphical user interface is provided to enable the user to set values for criteria, alternatives, and the like. For example, the user may set the values of the criteria by manipulating a slider bar. Alternatively, a computer may be programmed to set the values of the criteria in a manner based on past usage or default values.

Examples of criteria and ranges of values are discussed further with reference to FIGS. 3 and 4 below.

The criteria behavior module 206 analyzes predetermined attributes for a set of alternatives and generates a set of scores reflecting the desirability of the attributes. In the embodiment of FIG. 1, the analysis is accomplished through matrix manipulation. The analyzed attributes include the values of the tradeoff criteria. For example, if the alternatives are personal computers, computer #1 is a personal computer, price is a criterion, and $1,000 is the value of price for computer #1, then a price of $1,000 is an attribute of computer #1.

The criteria behavior module 206 transforms a heterogeneous matrix of alternatives and attributes into a homogeneous matrix containing scores that represent the alternatives and attributes. The criteria behavior module 206 analyzes the value for each criterion with respect to each alternative, and generates a set of scores that reflects the desirability of each value for each criterion with respect to each alternative. The criteria behavior module 206 uses logic diagrams such as affinity curves, workflows, decision trees, statistical models, and programming modules. Examples of values of criteria with respect to various alternatives are discussed further with reference to FIGS. 3 and 4 below.

The scoring and ranking module 208 takes the values from the tradeoff module 104 and the set of scores from the criteria behavior module 206 and generates a ranked list of alternatives. The ranked list of alternatives is generated by taking a weighted sum of the values from the tradeoff module 204 and the set of scores from the criteria behavior module 206. The cumulative scores obtained by the weighted sum are then ordered to yield the ranked list.

For example, suppose that the alternatives are personal computer #1 and personal computer #2, the criteria are price and screen size, personal computer #1 has a price of $1,000, personal computer #2 has a price of $1,200, personal computer #1 has a screen size of 15", personal computer #2 has a screen size of 20", price has a tradeoff value of 0.5, screen size has a tradeoff value of 0.6, a price of $1,000 for personal computer #1 has a desirability of 0.7, a price of $1,200 for personal computer #2 has a desirability of 0.8, a screen size of 15" for personal computer #1 has a desirability of 0.6, and a screen size of 20" for personal computer #2 has a desirability of 0.5. The criteria matrix then contains two rows, one for each alternative, the values of which are ($1,000, 15") for personal computer #1 and ($1,200, 20") for personal computer #2. The criteria behavior module converts this matrix of heterogeneous values into a matrix of corresponding homogeneous scores, the rows of which are (0.7, 0.6) and (0.8, 0.5) for personal computers #1 and #2, respectively. The weighted sums are (0.7*0.5)+(0.6*0.6)=0.35+0.36=0.71 for personal computer #1, and (0.8*0.5)+(0.5*0.6)=0.40+0.30=0.70 for personal computer #2. Thus, personal computer #2 is ranked first, since personal computer #2 has the lowest cumulative score; personal computer #1 is ranked second.

This algorithm has meaningfully compared such diverse criteria for laptop computers as price and screen size.

Figure 3:
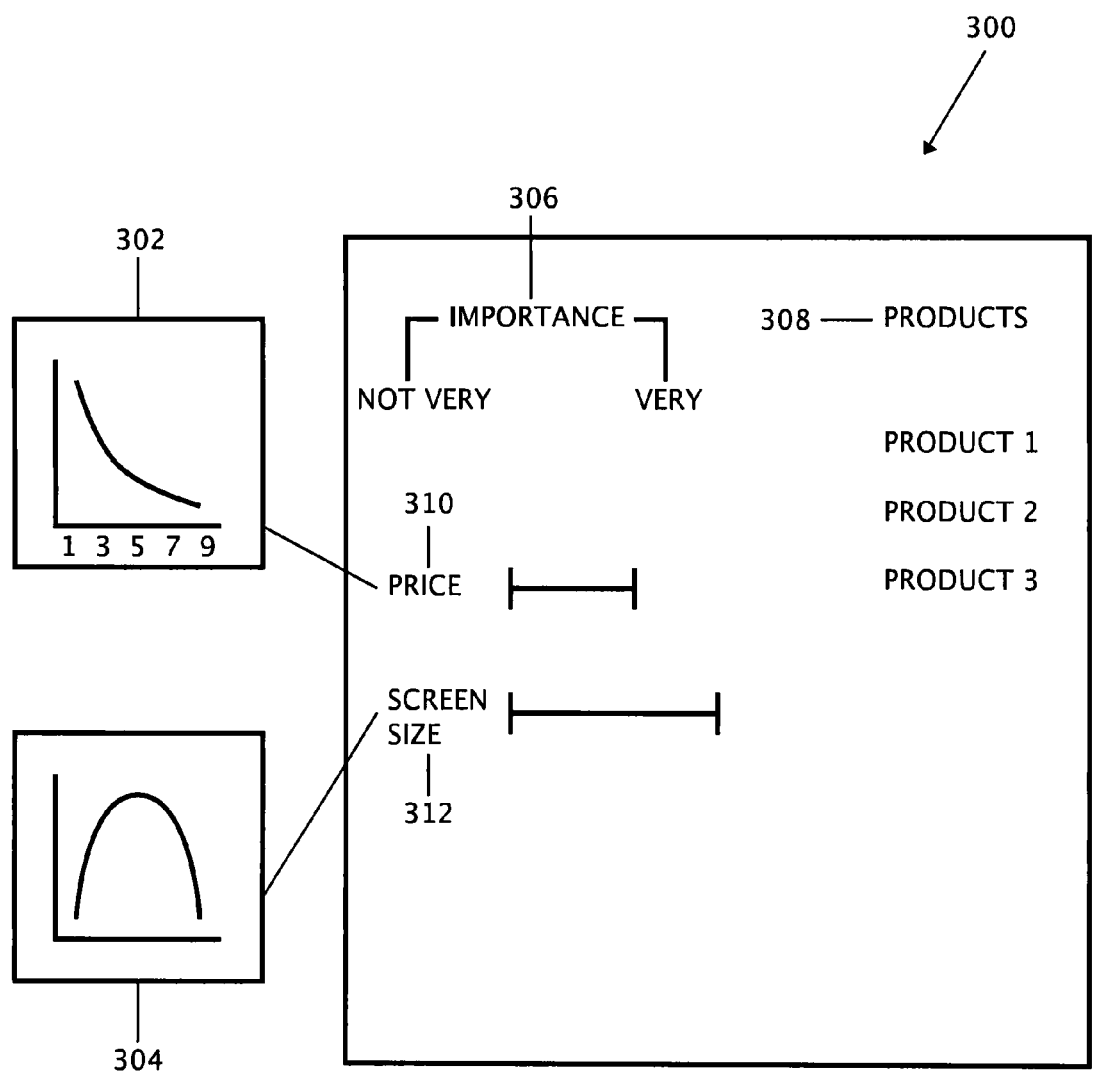
FIG. 3 is a diagram illustrating the principal components of the present invention, including proposals (products), tradeoffs, criteria, and the importance of various criteria.
Figure 4:
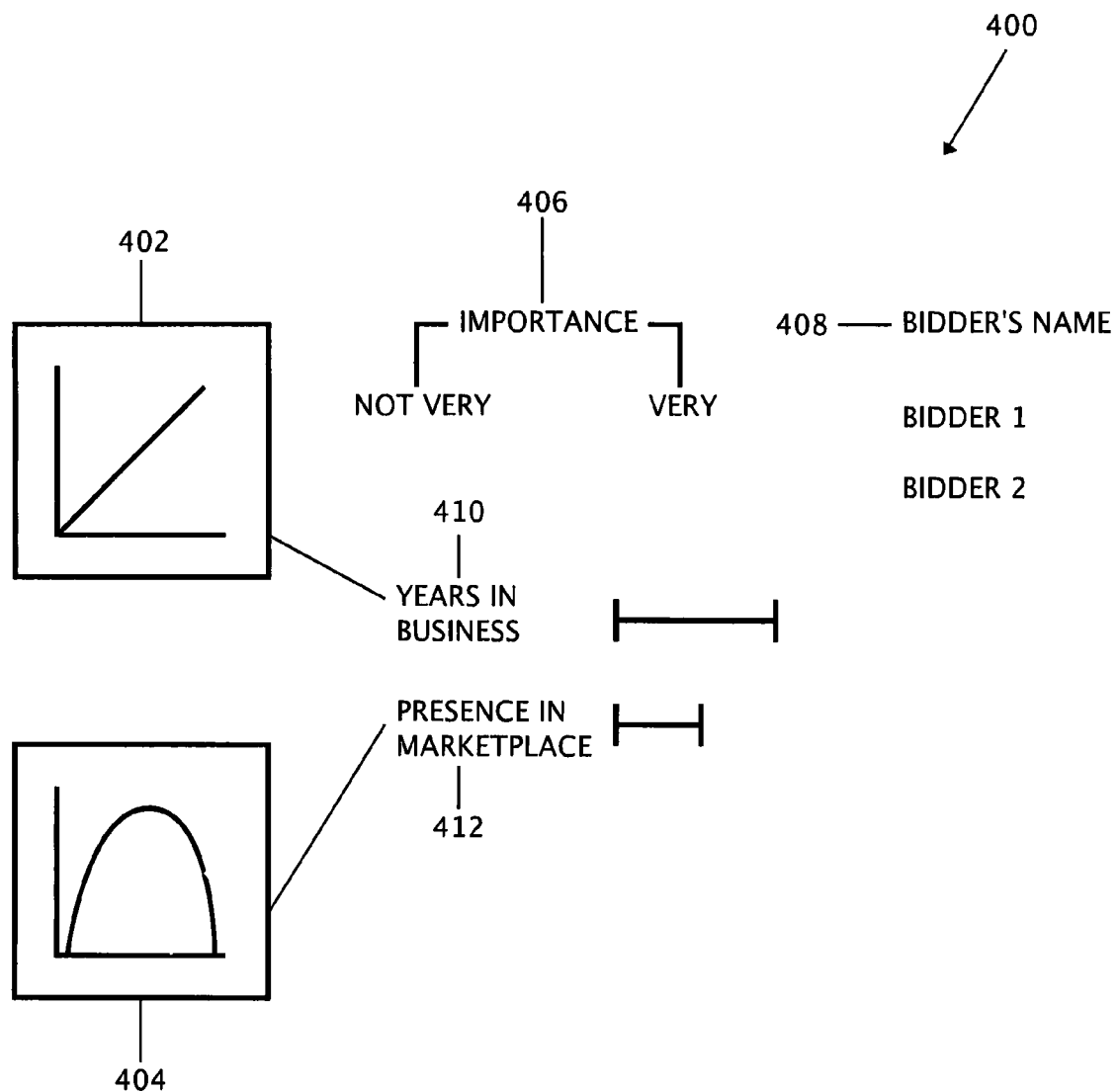
FIG. 4 is a diagram illustrating the principal components of the reverse auctions of the present invention, including bidders, tradeoffs, criteria, and the importance of various criteria.

FIG. 3 is a diagram 300 illustrating some principal components of a comparison engine such as comparison engine 102 of FIG. 1. The ranked alternatives are the products 308 labeled Product 1, Product 2, and Product 3. For example, the products may be personal computers, automobiles, or any variety of goods and service, a variety of proposals, etc. The tradeoff criteria include price 310 and screen size 312. The comparison engine 102 presents a slider bar 306 that is used by a user or a machine to specify the importance of the tradeoff criteria on a scale ranging from not very important to very important. The input of the slider bar 306 is normalized by the comparison engine 102 to indicate the importance of various criteria. In FIG. 3 price 310 is less important than screen size 312, as shown by the lengths of the respective lines. This technique allows a user to visually make decisions in an intuitive manner. These normalized values maintain the relative importance of the tradeoffs, and can be used to compare tradeoffs across ranking operations.

The diagrams 302 and 304 illustrate desirability of the values for the criteria for the alternatives. Price 310 is represented by a downward-tending curve, showing that desirability decreases as value (actual price) increases. Screen size 312 is represented by a bell curve, showing that desirability rises to a maximum value as value (actual screen size) increases and then decreases as value further increases.

The comparison engine 102 can be used to facilitate a reverse auction, in which suppliers submit bids to a purchaser who desires specific goods or services. FIG. 4 is a diagram 400 showing the principal components of a reverse auction. The alternatives (suppliers) are represented by the bidders 408 named Bidder 1 and Bidder 2. The tradeoff criteria are the years in business 410 and presence in marketplace 412 of the bidders.

The slider bar 406 allows a user or machine to specify the importance of the tradeoff criteria on a scale ranging from not very important to very important. In FIG. 4 years in business 410 is more important than presence in marketplace 412, as shown by the lengths of the respective lines.

The diagrams 402 and 404 illustrate the desirability of the values for the criteria. Years in business 410 is represented by a rising line, showing that desirability increases directly with an increase in value (actual number of years in business). Presence in market place 412 is represented by a bell curve, showing that desirability increases toward a maximum value as value (actual presence in marketplace) increases and then decreases as value further increases.

Figure 5:
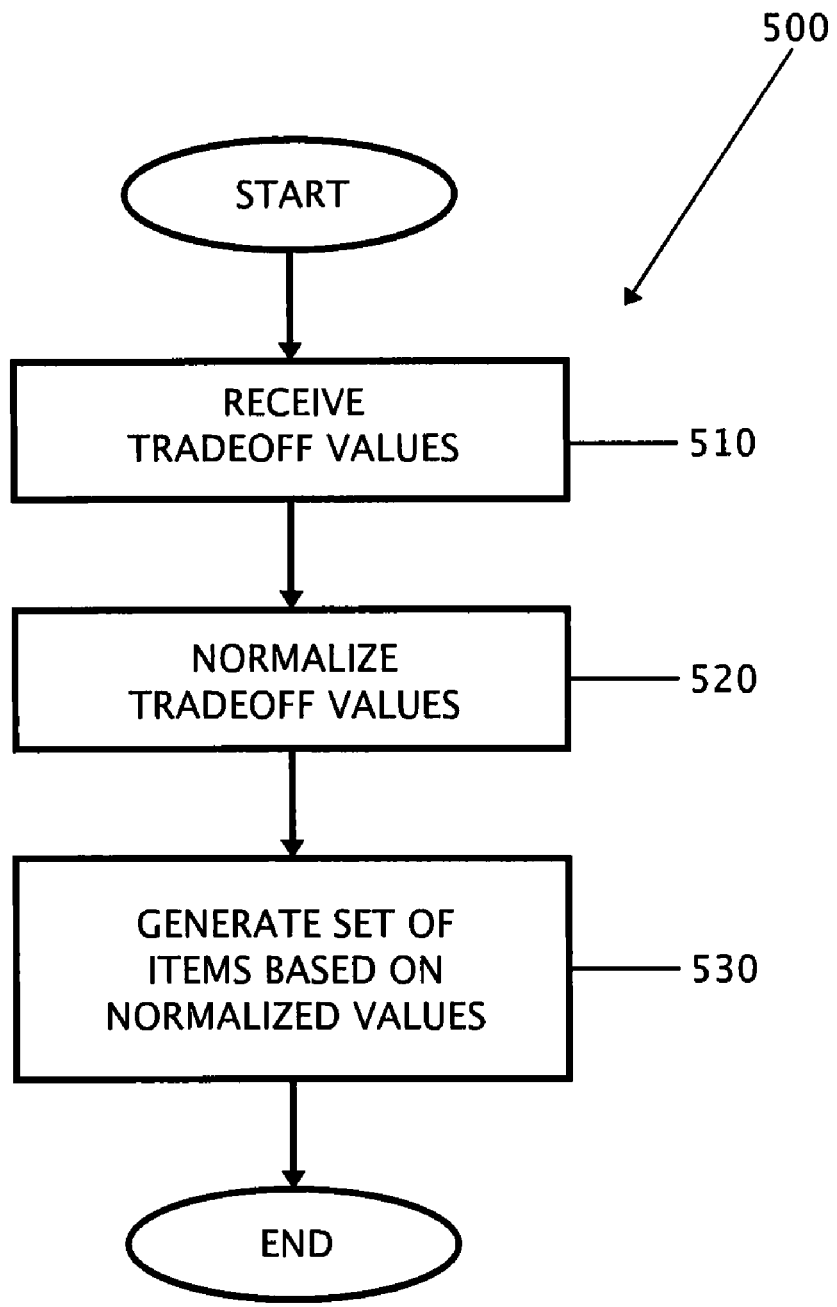
FIG. 5 is a flow chart illustrating the operation of the tradeoff module of the comparison engine of the present invention.

FIG. 5 is a flow chart 500 illustrating the operation of the tradeoff module 104 of the comparison engine 102 according to one embodiment of the present invention. In a first step 510, the tradeoff module 104 receives the tradeoff values set by a user or a machine, e.g., by way of a slider bar as described above. The tradeoff values are measured on a scale ranging from not very important to very important, or some other range suitable for the particular application. In a next step 520, the tradeoff module 104 normalizes the tradeoff values, to produce normalized values such as 80/100. In a next step 530, the tradeoff module 104 generates a set of items based on the normalized values.

Figure 6:
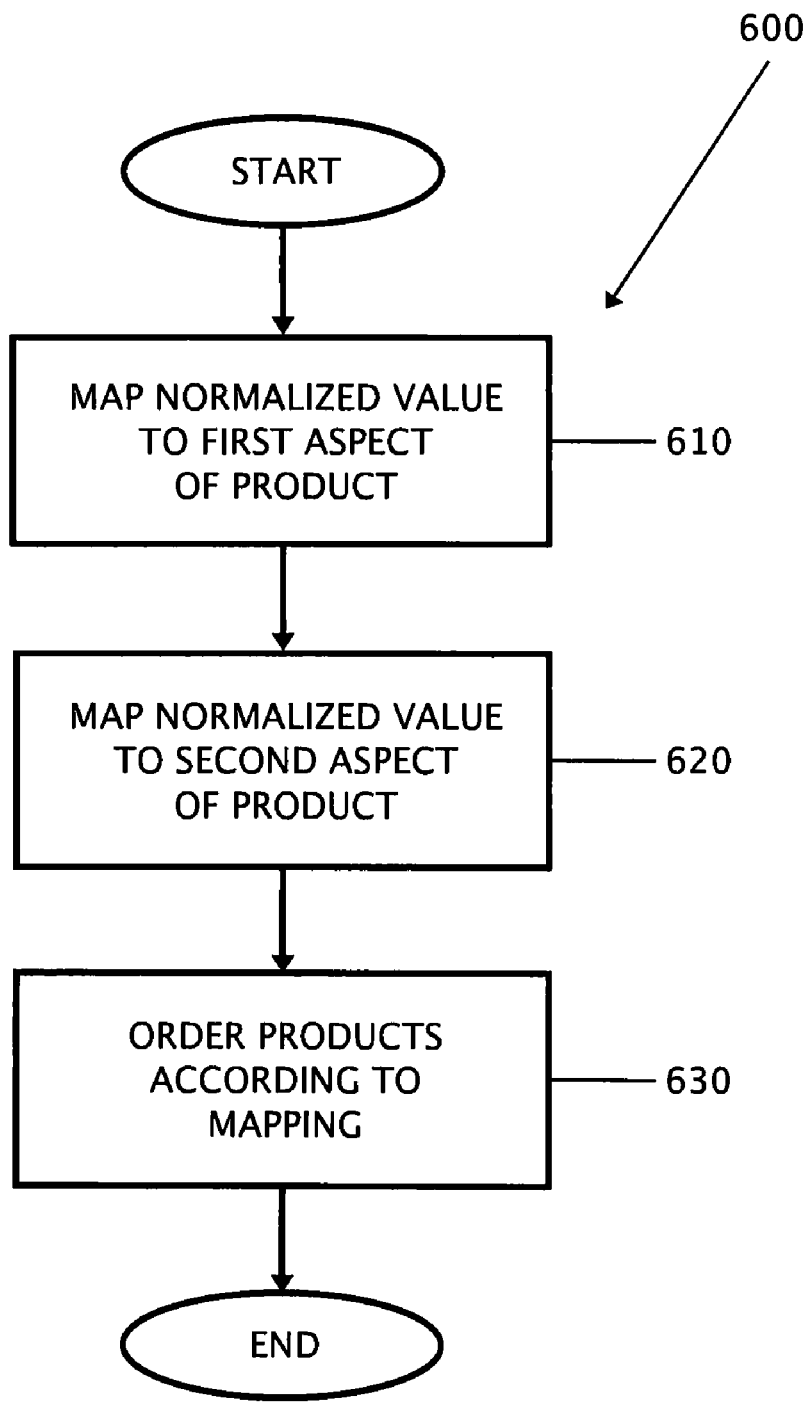
FIG. 6 is a flow chart further illustrating the operation of the criteria behavior module of the comparison engine of the present invention.

FIG. 6 is a flow chart 600 illustrating the operation of the criteria behavior module 106 of the comparison engine 102 according to one embodiment of the present invention. In a first step 610, the criteria behavior module 106 maps a normalized value to a first aspect of a product (alternative). In a next step 620, the criteria behavior module 106 maps a normalized value to a second aspect of the product. In a next step 630, the criteria behavior module 106 orders the products according to the mapping performed in the earlier steps.

Figure 7:
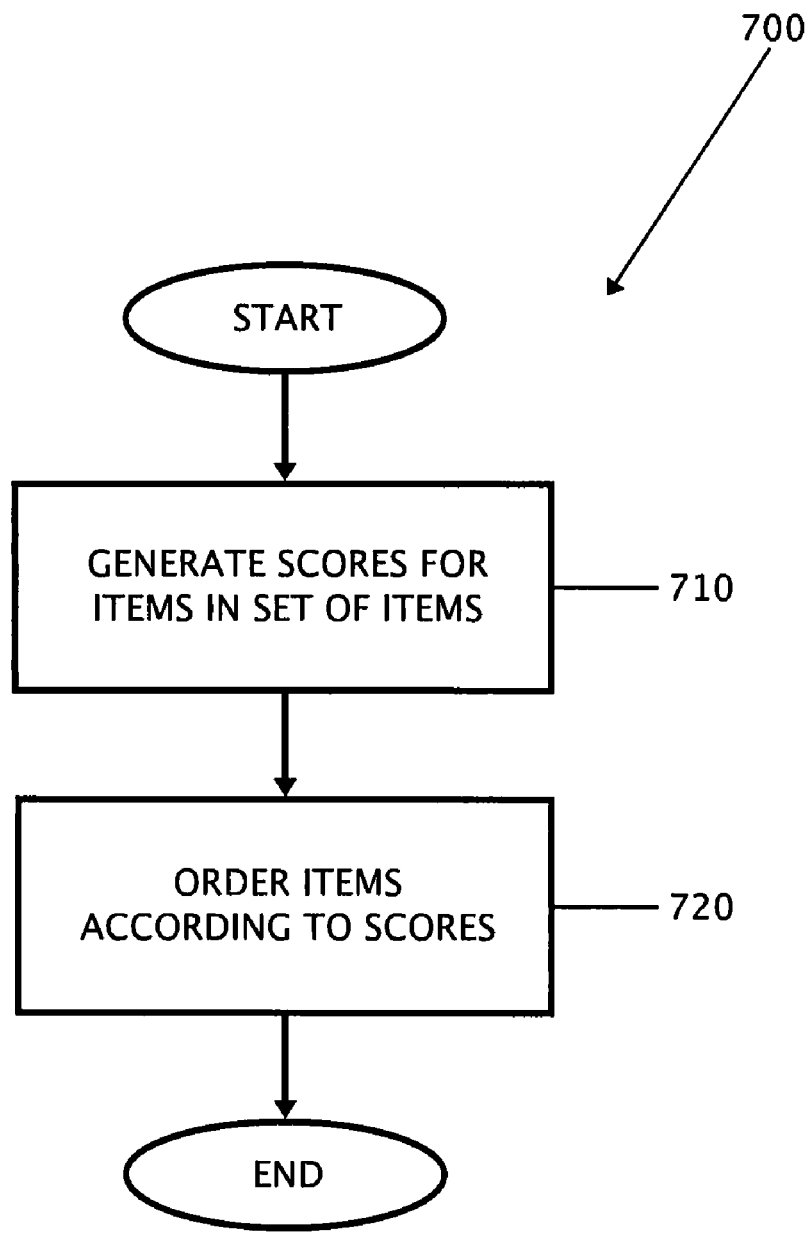
FIG. 7 is a flow chart illustrating the operation of the scoring and ranking module of the comparison engine of the present invention.

FIG. 7 is a flow chart 700 illustrating the operation of the scoring and ranking module 108 of the comparison engine 102 according to one embodiment of the present invention. In a first step 710, the scoring and ranking module 108 generates scores for items in a set of items. In a next and final step 720, the scoring and ranking module 108 orders the items according to their scores.

Figure 8:
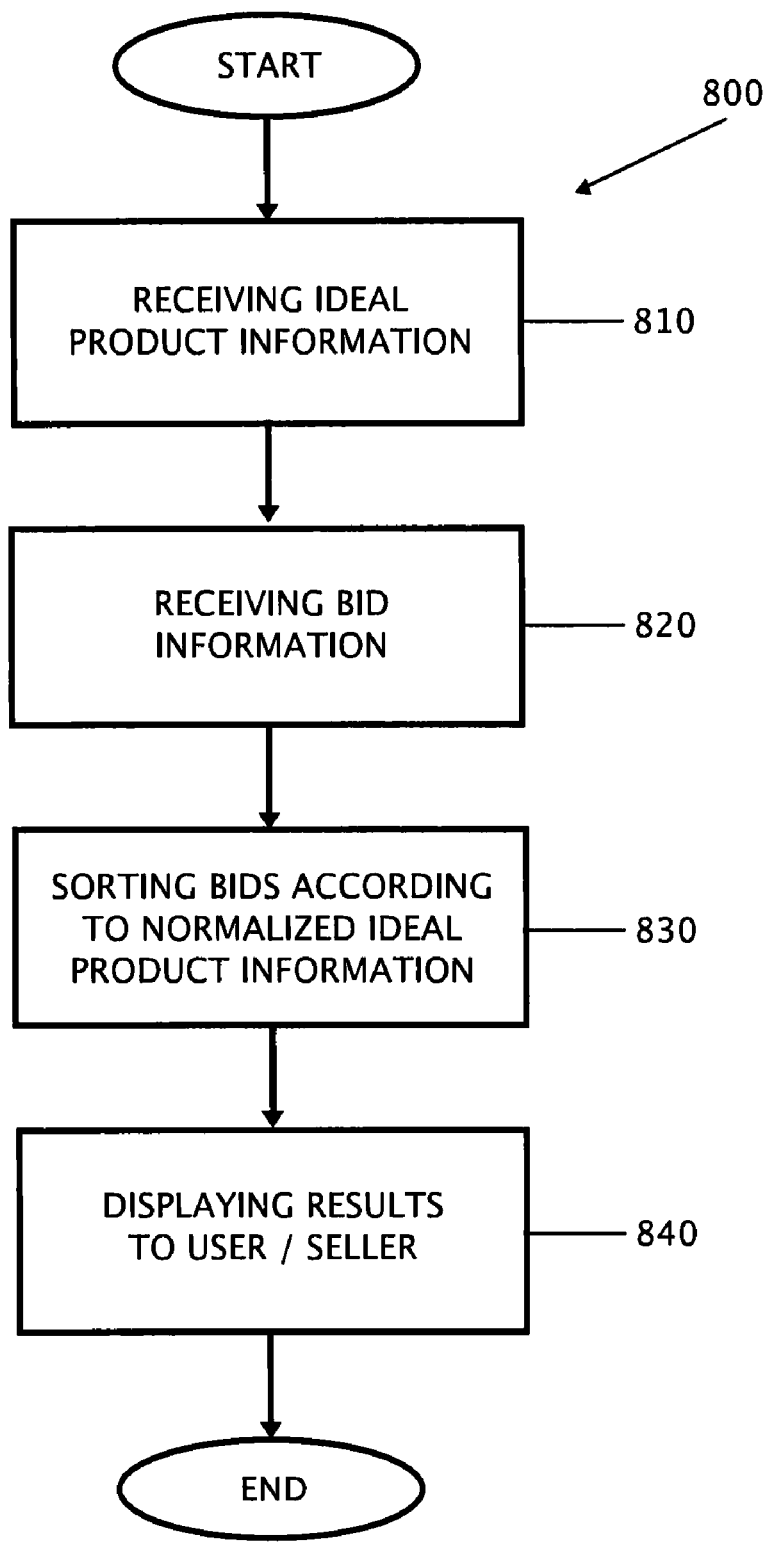
FIG. 8 is a flow chart illustrating the steps of the reverse auctions of the present invention.

FIG. 8 is a flow chart 800 illustrating the steps of the reverse auctions according to certain embodiments of the present invention. In a first step 810, the comparison engine 102 receives ideal product information. In a next step 820, the comparison engine 102 receives bid information. In a next step 830, the comparison engine 102 sorts the bids according to the normalized ideal product information. In a next and final step 840, the comparison engine 102 displays the results to the user and seller.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

We claim:

1. A comparison engine for generating a ranked list of alternatives, the comparison engine comprising:
    a tradeoff module, executing on a computer, the tradeoff module having at least two tradeoff criteria, the at least two tradeoff criteria having a range of possible values, the tradeoff module being capable of receiving assigned values for the at least two tradeoff criteria,
    a criteria behavior module, the criteria behavior module being capable of analyzing predetermined attributes for a set of alternatives, where the attributes include values of the tradeoff criteria, the criteria behavior module being further capable of generating a set of scores reflecting desirability of the attributes using at least two logic diagrams, and
    a scoring and ranking module, the scoring and ranking module being capable of receiving the assigned values from the tradeoff module and the set of scores from the criteria behavior module and generating a ranked list of alternatives.

2. The comparison engine as recited in claim 1, wherein the assigned values are provided by a user or a machine.

3. The comparison engine as recited in claim 1, wherein the at least two logic diagrams are represented by at least one selected from the group consisting of affinity curves, workflows, decision trees, statistical models, and programming modules.

4. The comparison engine as recited in claim 1, wherein the criteria behavior module transforms a heterogeneous matrix of alternatives and attributes into a homogenous matrix containing scores, wherein the scores are representative of the alternatives and attributes.

5. The comparison engine as recited in claim 1, wherein the ranked list of alternatives is generated by taking a weighted sum of the assigned values from the tradeoff module and the set of scores from the criteria behavior module.

6. The comparison engine as recited in claim 1, wherein the ranked list of alternatives is a set of requested proposals or a set of consumer merchandise.

7. The comparison engine as recited in claim 1, further comprising:
    a slider bar for setting at least one of the at least two tradeoff values, the slider bar capable of being set by a user or a machine.

8. The comparison engine as recited in claim 1, wherein the at least two logic diagrams represent expert knowledge corresponding to particular criteria.

9. The comparison engine as recited in claim 1, further comprising:
    a training module, the training module capable of being trained by the user to create the at least two logic diagrams.

10. The comparison engine as recited in claim 1, wherein the comparison engine is used to facilitate a reverse auction.

11. The comparison engine as recited in claim 1, wherein the comparison engine is used to facilitate a solicitation process in a reverse auction.

12. The comparison engine as recited in claim 10, wherein the tradeoffs correspond to an ideal profile for required goods and services and the ranked list of alternatives correspond to bids.

13. The comparison engine as recited in claim 10, further comprising an authentication module for authenticating a user's identity.

14. The comparison engine as recited in claim 13, wherein the authentication module is used to authenticate a buyer and at least one seller in the reverse auction.

15. The comparison engine as recited in claim 1, wherein the assessment and scoring of a list of proposals is performed automatically by the engine, at the click of a button, without the need for a human to read, assess, and score the proposals.

16. A method for generating a ranked list of alternatives, the method comprising a computer executing the steps of:
    generating a homogeneous matrix of scores based on a heterogeneous matrix of attributes and alternatives,
    receiving two or more tradeoff values,
    generating a ranked list of alternatives based on the homogeneous matrix of scores and the tradeoff values, and
    using a training program to create a logic graph.

17. A method as recited in claim 16, wherein the homogeneous matrix of scores is generated using at least one logic diagram.

18. A method as recited in claim 17, wherein the at least one logic diagram is at least one selected from the group consisting of affinity curves, workflows, decision trees, statistical model, programming modules.

19. A method as recited in claim 16, wherein the ranked list of alternatives is generated by calculating the weighted sum of at least one score in the homogeneous matrix of scores and the tradeoff value.

20. A method as recited in claim 16, wherein the tradeoff value corresponds to an ideal profile for required goods and the ranked list of alternatives corresponds to bids.

21. A method as recited in claim 20, further comprising:
    receiving bid information from at least two bidders,
    generating a heterogeneous matrix of alternatives and attributes based on the bid information,
    scoring the bids according to the homogenous matrix of scores,
    wherein the ranked list of alternatives comprises the bid information.

22. A method as recited in claim 16, wherein a web interface is used to receive the tradeoff value and display the ranked list of alternatives.

23. A system for generating a ranked list of alternatives, the system comprising:
    means for generating a homogeneous matrix of scores based on a heterogeneous matrix of attributes and alternatives,
    means for receiving two or more tradeoff values,
    means for generating a ranked list of alternatives based on the homogeneous matrix of scores and the tradeoff value, and
    means for creating a logic graph using a training program.

24. A system as recited in claim 23, further comprising:
    means for generating a logic diagram, the logic diagram being used to generate the homogeneous matrix of scores.

* * * * *